(12) United States Patent
Lille et al.

(10) Patent No.: US 7,133,255 B2
(45) Date of Patent: Nov. 7, 2006

(54) MAGNETIC HEAD HAVING MAGNETIC POLE WITH LENGTHENED NECK POLE TIP AND COPLANAR YOKE, AND METHOD OF FABRICATION THEREOF

(75) Inventors: Jeffrey S. Lille, Sunnyvale, CA (US); Neil Smith, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 560 days.

(21) Appl. No.: 10/650,943

(22) Filed: Aug. 27, 2003

(65) Prior Publication Data

US 2005/0047012 A1 Mar. 3, 2005

(51) Int. Cl.
*G11B 5/147* (2006.01)

(52) U.S. Cl. ........................................ 360/126
(58) Field of Classification Search ............... None
See application file for complete search history.

(56) References Cited

U.S. PATENT DOCUMENTS

| | | | | |
|---|---|---|---|---|
| 5,282,308 A | * | 2/1994 | Chen et al. | 360/125 |
| 5,438,747 A | | 8/1995 | Krounbi et al. | 29/603 |
| 5,488,528 A | | 1/1996 | Chen et al. | 360/126 |
| 5,649,351 A | | 7/1997 | Cole et al. | 29/603.14 |
| 5,802,700 A | | 9/1998 | Chen et al. | 29/603.14 |
| 5,805,391 A | | 9/1998 | Chang et al. | 360/113 |
| 5,809,637 A | | 9/1998 | Rottmayer | 29/603.15 |
| 5,843,521 A | | 12/1998 | Ju et al. | 429/129 |
| 5,901,432 A | | 5/1999 | Armstrong et al. | 29/603.14 |
| 5,916,423 A | | 6/1999 | Westwood | 204/192.32 |
| 6,029,339 A | | 2/2000 | Chang et al. | 29/603.14 |
| 6,054,023 A | | 4/2000 | Chang et al. | 204/192.2 |
| 6,069,775 A | | 5/2000 | Chang et al. | 360/126 |
| 6,106,679 A | | 8/2000 | Westwood | 204/192.32 |
| 6,119,331 A | | 9/2000 | Chang et al. | 29/603.14 |
| 6,172,848 B1 | | 1/2001 | Santini | 360/126 |
| 6,226,149 B1 | | 5/2001 | Dill, Jr. et al. | 360/126 |
| 6,278,591 B1 | | 8/2001 | Chang et al. | 360/317 |
| 6,301,084 B1 | | 10/2001 | Santini | 360/317 |
| 6,317,289 B1 | * | 11/2001 | Sasaki | 360/126 |
| 6,337,783 B1 | * | 1/2002 | Santini | 360/125 |
| 6,339,872 B1 | | 1/2002 | Chang et al. | 29/603.14 |
| 6,373,657 B1 | * | 4/2002 | Kamijima | 360/126 |
| 6,483,664 B1 | * | 11/2002 | Kamijima | 360/126 |
| 6,624,971 B1 | * | 9/2003 | Sasaki | 360/126 |

\* cited by examiner

*Primary Examiner*—Robert S. Tupper
(74) *Attorney, Agent, or Firm*—Robert O. Guillot; Intellectual Property Law Offices (57) ABSTRACT

A magnetic head having a magnetic pole that includes a pole tip and a yoke. The pole tip includes an elongated neck, having an anchor piece on one end and a yoke interconnection piece on the other end. The air bearing surface of the head is located approximately at the midpoint of the elongated neck, and shadowing effects of the end pieces during the ion milling notching process do not create significant variations in the width of the neck at locations near the midpoint of the neck. As a result, variations of the pole tip width at the ABS of fabricated magnetic heads is significantly reduced, and processing yield is therefore increased. The yoke is engaged to the pole tip at a location along the neck that is close to the air bearing surface. In a preferred embodiment, the yoke interconnect piece is encapsulated within the yoke.

20 Claims, 6 Drawing Sheets

MAGNETIC HEAD HAVING MAGNETIC POLE WITH LENGTHENED NECK POLE TIP AND COPLANAR YOKE, AND METHOD OF FABRICATION THEREOF

BACKGROUND OF THE INVENTION

1. Field of the Invention

The present invention relates generally to magnetic heads that are utilized with thin film hard disk data storage devices, and more particularly to the design and fabrication of a magnetic head having an improved second magnetic pole including a coplanar P2 pole tip and pole yoke.

2. Description of the Prior Art

In the process for fabricating magnetic heads for hard disk drives, thousands of magnetic heads are simultaneously fabricated in rows and columns across the surface of a substrate wafer, and it is a processing consistency goal that each of the magnetic heads be virtually identical. One of the most important magnetic head parameters is the width of the base of the pole tip which determines the track width that data bits will be written by the magnetic head. Therefore, process consistency in identically forming the width of the base of the pole tip of each of the magnetic heads is very important in obtaining acceptable throughput in fabricating the magnetic heads.

In the magnetic head pole tip fabrication process that pertains to the present invention, one of the many fabrication steps in forming the pole tip is an ion milling step, which is conducted following the fabrication of the pole tip in order to notch a magnetic pole that is disposed beneath to the pole tip. This notching process is well known and understood by those skilled in the art. When the pole tip is fabricated, it is formed with a thin neck, a large anchor piece on one end of the neck, and a large yoke interconnect piece at the other end of the neck. Significantly, during the ion milling notching step, the large pieces at the neck ends have been shown to produce a shadowing of the milling ions during the notching step. As a result, the width of the neck will vary between the two large end pieces, being generally narrower in the more exposed central portion of the neck and wider in the portions of the neck that are shadowed by their closeness to the large end pieces.

The variation in the width of the neck of the pole tip is undesirable in that it results in a variation of the width of the pole tip base throughout the many magnetic heads that are simultaneously formed on the substrate. The present invention is a method for achieving process uniformity of the pole tip width throughout the many magnetic heads that are fabricated across the surface of the substrate.

SUMMARY OF THE INVENTION

The magnetic head of the present invention has a magnetic pole that includes a pole tip portion and a yoke portion. The pole tip is fabricated with an elongated neck portion, having an enlarged anchor piece on one end of the neck and a large yoke interconnection piece on the other end of the neck. The interface between the pole tip and yoke is non-perpendicular to the air bearing surface (ABS) of the magnetic head, and the ABS is located approximately at the midpoint of the elongated neck. As a result, the shadowing effects of the enlarged end pieces during the ion milling notching process do not create significant variations in the width of the neck at locations near the midpoint of the neck. Shadowing effects still exist at locations near the enlarged end pieces, but the shadowing effects are thus away from the central portion of the elongated neck. As a result, variations of the pole tip width at the ABS of the magnetic heads that are fabricated across the surface of the substrate are significantly reduced, and processing yield is therefore increased. The yoke and pole tip neck are both magnetic, however the connection of these two structures brings additional challenges. Ideally, the yoke and pole tip will be formed of dissimilar materials to promote better write head switching characteristics.

Additionally, for the purposes of rapid magnetic field switching during the magnetic head writing process, it is undesirable to have an elongated neck portion of the pole tip. To resolve this problem, the yoke portion of the second magnetic pole is engaged to the pole tip at a location along the neck that is close to the air bearing surface. In a preferred embodiment, the yoke is fabricated such that the yoke interconnect piece of the pole tip is encapsulated within the yoke. Improved magnetic domain formation in the neck is thereby achieved, such that rapid magnetic field switching of the pole tip can be obtained.

Because the pole tip and yoke are formed of dissimilar materials, it is particularly desirable to minimize the potential magnetic discontinuity in the normal component of the magnetization in the case where the yoke magnetization direction is parallel to the ABS, which represents either the quiescent state, or that state midway between a reversal during write operation. It is also desirable to do this while keeping the encapsulated portion of the pole tip a small fraction of the total volume of the yoke, thereby minimizing any detrimental effects of the aforementioned undesirable magnetic properties of the high Bs pole tip material. As taught in the present invention, this can be achieved by judicious choice of the geometry of the encapsulated portion of the pole-tip.

It is an advantage of the magnetic head of the present invention that it includes an improved second magnetic pole tip to facilitate the writing of data to a magnetic disk.

It is another advantage of the magnetic head of the present invention that it includes a second magnetic pole having a pole tip and a yoke that are coplanar.

It is a further advantage of the magnetic head of the present invention that it includes a second magnetic pole in which the yoke interconnect portion of the pole tip is encapsulated within the yoke.

It is yet another advantage that the interface between the pole tip and yoke structures is non-perpendicular to the ABS plane It is an advantage of the hard disk drive of the present invention that it includes a magnetic head that it includes an improved second magnetic pole tip to facilitate the writing of data to a magnetic disk.

It is another advantage of the hard disk drive of the present invention that it includes a magnetic head that it includes a second magnetic pole having a pole tip and a yoke that are coplanar.

It is a further advantage of the hard disk drive of the present invention that it includes a magnetic head that includes a second magnetic pole in which the yoke interconnect portion of the pole tip is encapsulated within the yoke.

It is yet another advantage of the hard disk drive of the present invention that it includes a magnetic head in which the interface between the pole tip and yoke structures is non-perpendicular to the ABS plane.

It is an advantage of the method for manufacturing the magnetic head of the present invention that the P2B dimension of magnetic heads fabricated on a wafer substrate is more consistently formed.

It is another advantage of the method for manufacturing a magnetic head of the present invention that increased yield of magnetic heads fabricated on a wafer substrate is obtained.

These and other features and advantages of the present invention will no doubt become apparent to those skilled in the art upon reviewing the following detailed description which makes reference to the several figures of the drawings.

IN THE DRAWINGS

The following drawings are not made to scale of an actual device, and are provided for illustration of the invention described herein.

DETAILED DESCRIPTION OF THE PREFERRED EMBODIMENTS

Figure 1:
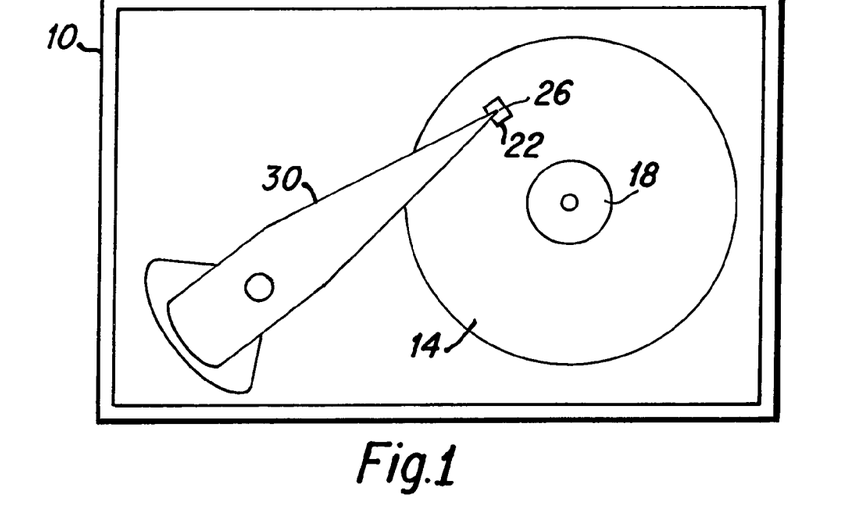
FIG. 1 is a schematic top plan view of a hard disk drive including the magnetic head of the present invention.

Efforts to increase areal data storage density of hard disk drives have lead to improvements in the structure and function of the write head elements of magnetic heads. A simplified top plan view of a typical hard disk drive 10 which is suitable to include the magnetic head of the present invention is presented in FIG. 1. As depicted therein, at least one hard disk 14 is rotatably mounted upon a motorized spindle 18. A slider 22, having a magnetic head 26 disposed thereon, is mounted upon an actuator arm 30 to fly above the surface of each rotating hard disk 14, as is well known to those skilled in the art. The present invention includes improved features and manufacturing methods for such magnetic heads 26, and to better described the present invention a prior art magnetic head is next described.

Figure 2:
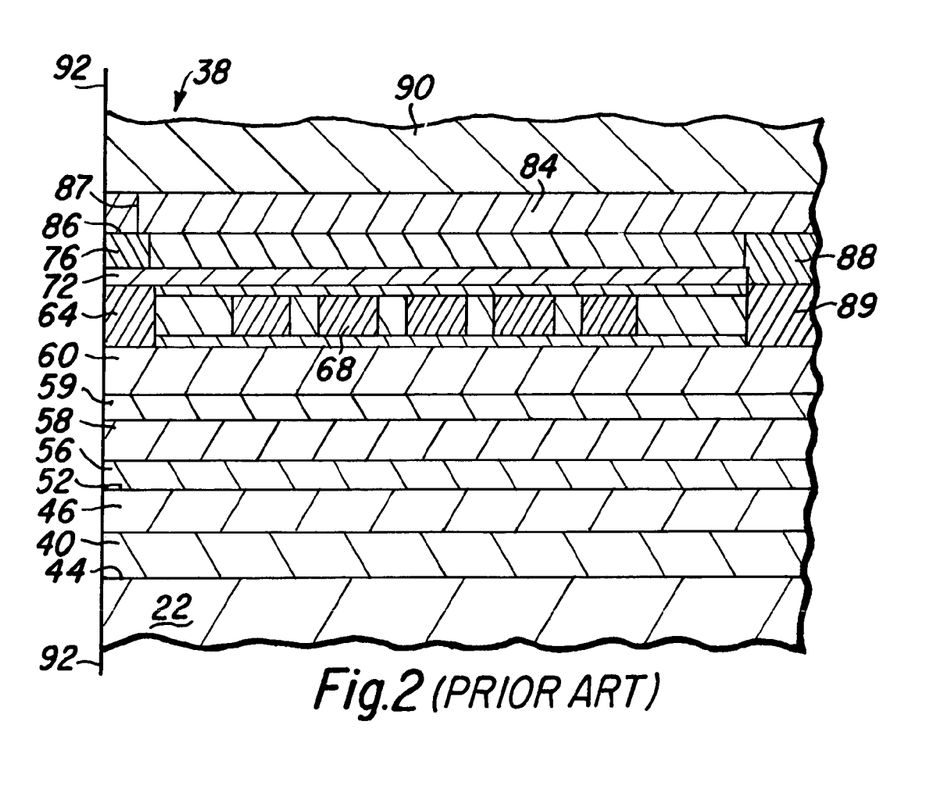
FIG. 2 is a side cross-sectional view depicting various components of a prior art magnetic head.

As will be understood by those skilled in the art, FIG. 2 is a side cross sectional view depicting portions of a prior art magnetic head 38. The magnetic head 38 includes a first magnetic shield layer (S1) 40 that is formed upon a surface 44 of the slider body material 22. A first insulation layer (G1) 46 is formed on the S1 shield 40 and a read head sensor element 52 is formed on the G1 layer 46. A second insulation layer (G2) 56 is formed on the sensor 52, and a second magnetic shield layer (S2) 58 is formed upon the G2 insulation layer 56. An electrical insulation layer 59 is then deposited upon the S2 shield 58, and a first magnetic pole (P1) 60 is fabricated upon the insulation layer 59.

Following the fabrication of the P1 layer 60, a P1 pole pedestal 64 is fabricated upon the P1 layer 60, and a first induction coil layer 68 is fabricated above the P1 layer within the layer that includes the P1 pole pedestal 64. A write gap layer 72 is next deposited, followed by the fabrication of a P2 magnetic pole tip 76. Thereafter, a yoke portion 84 of the second magnetic pole is fabricated above the P2 pole tip 76 in magnetic connection with the upper surface 86 of the P2 pole tip 76, and through back gap elements 88 and 89 to the P1 layer 60. It can be is seen that the yoke 84 has a front portion 87 and it is magnetically connected to the pole tip 76 through the top surface 86 of the pole tip. This connection of the P2 pole tip 76 and the yoke 84 is discussed in detail herebelow. The head is subsequently encapsulated in alumina 90 and fabricated such that an air bearing surface (ABS) 92 is created. The throat height of the magnetic head is determined by the distance that the P2 pole tip 76 extends back from the ABS 92, as will be understood by those skilled in the art. There are many detailed fabrication steps to create the magnetic head that are well known to those skilled in the art, and which are not deemed necessary to describe herein in order to provide a full understanding of the present invention.

Figure 3:
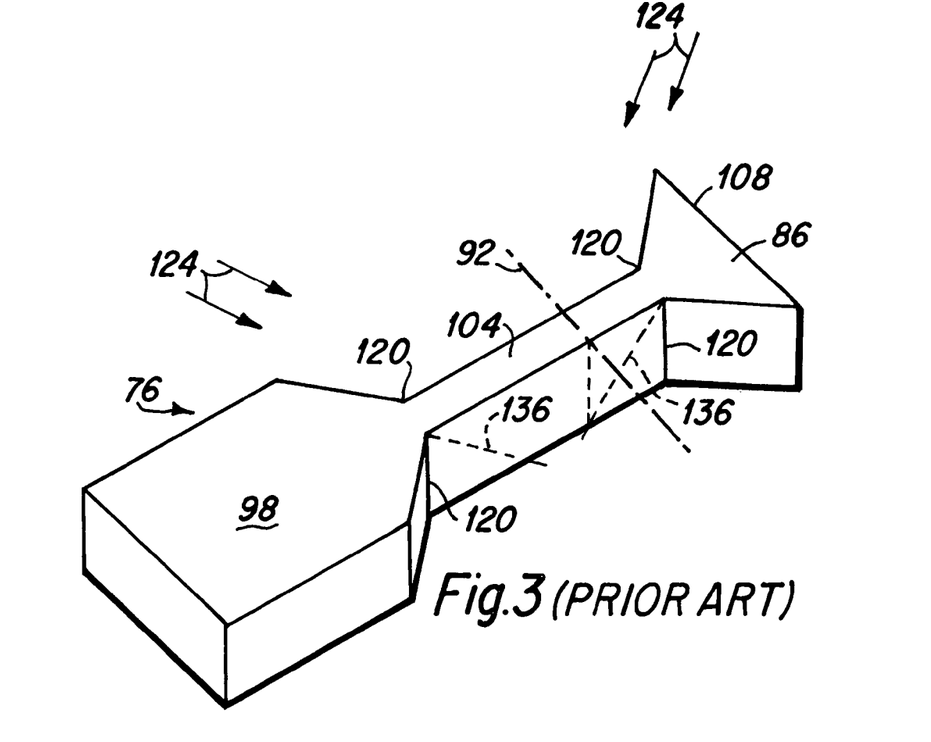
FIG. 3 is a perspective view depicting a prior art pole tip.

The prior art P2 pole tip 76 is typically fabricated in a photolithographic and electroplating process, and FIG. 3 is a perspective view depicting the P2 pole tip as initially fabricated. As depicted therein, the P2 pole tip 76 includes a relatively large anchor piece 98, a narrow neck portion 104 and a relatively large pole yoke interconnect piece 108 having a top surface 86. As is known to those skilled in the art, following the fabrication of magnetic heads upon the surface of a substrate wafer, the substrate is sliced into rows of magnetic heads that are subsequently polished and lapped to form the ABS 92. In the slicing process the anchor 98 and a portion of the neck 104 are removed, such that the ABS is formed relatively close to the interconnect piece 108. The locations in the pole tip 76 where the neck portion 104 flares outwardly into the anchor 98 and the yoke interconnect piece 108 are termed flare points 120.

Figure 4:
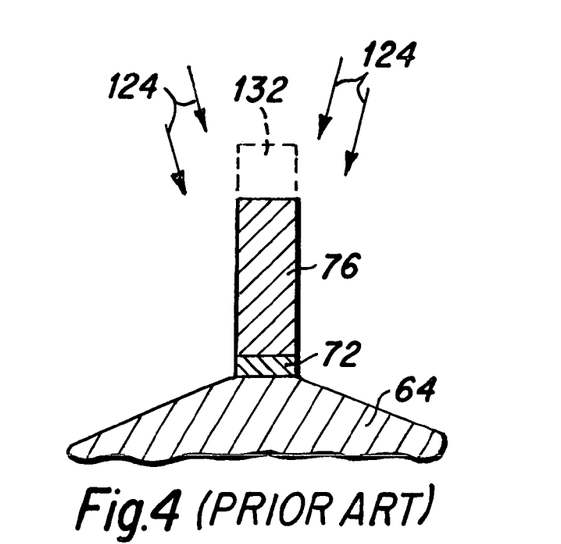
FIG. 4 is a side cross-sectional view depicting the notching of a P1 pole.

As is known to those skilled in the art, in order to improve the formation of magnetic data bits during the writing process and to reduce side writing from a P2 pole tip, a pole tip notching process is typically undertaken, and FIG. 4 is a side cross-sectional view depicting the notching of a pole tip. As depicted therein, following the fabrication of the P2 pole tip 76 depicted in FIG. 3, an ion milling step is performed wherein an ion beam 124 is directed downwardly to mill through the write gap layer 72 and into the P1 pole pedestal 64 below the write gap layer, thereby removing some P1 pole pedestal material and notching the P1 pole pedestal. This ion milling notching process, also removes material from the sides of the neck, thereby reducing the width of the neck. Additionally, a portion 132 of the top of the neck of the P2 pole tip is also removed. As a result, the P2 pole tip 76 must be fabricated with a high aspect ratio (height/width) such that after the notching process, a desired height of the P2 pole tip remains.

Figure 5:
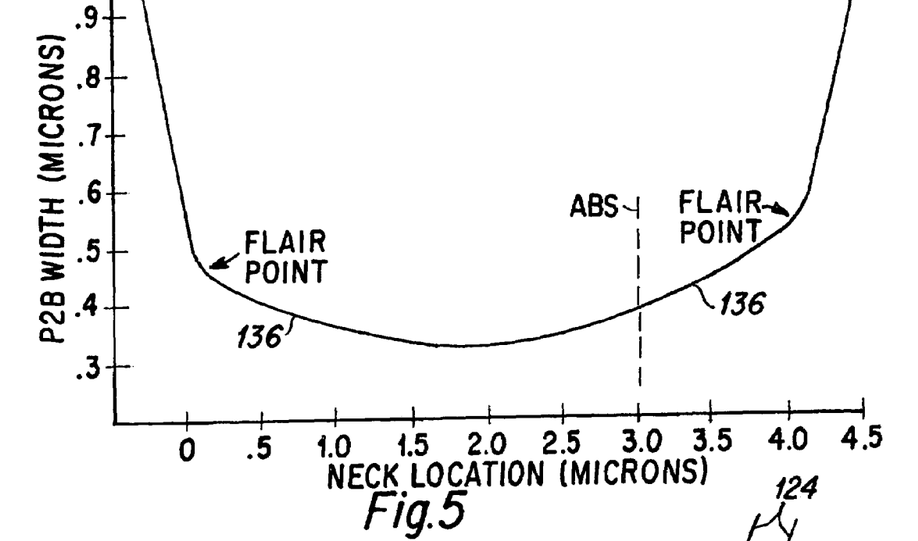
FIG. 5 is a graph depicting the relationship between the pole tip width and the distance between the flare points of a prior art magnetic pole due to the P1 pole notching step.

Returning for a moment to FIG. 3, the ion milling notching process is also depicted therein. As can be seen, the milling ions 124 are directed at off normal angles, as well as vertically, to notch the P1 pole. A significant unwanted effect that occurs during the notching process is that the larger P2 pole end pieces (the anchor 98 and yoke interconnect 108) create shadowing 136 of the ion milling process in locations close to the flare points 120. As a result of the shadowing 136, the notching of the P1 pole at locations close to the flare points 120 proceeds more slowly than the notching towards the center portions of the neck 104. Additionally, the narrowing of the width of the neck during ion milling is affected by the shadowing from the end pieces, and FIG. 5 is a graph that depicts the width of the neck of the P2 pole tip from flare point to flare point, as a result of the notching process. As can be seen in FIG. 5, due to the shadowing effects near the flare points, the width of the neck of the P2 pole tip at the bottom of the pole (commonly referred to as the P2 base or P2B) varies throughout the length of the neck. The variance is particularly significant in locations near the flare points of the P2 pole tip interconnect piece 108 because the air bearing surface 92 will be formed relatively close thereto, as is depicted in FIG. 3.

The problems created by the shadowing effect of the prior art P2 pole tip are that the P2B width can vary for different magnetic heads formed on the same substrate wafer due to small processing variations in the location of the ABS 92 as it is later fabricated. Additionally, due to the shadowing, an extended ion milling notching process time is undertaken to achieve a more consistent P2B width throughout the neck, thereby removing additional material 132 from the top of the P2 pole tip, thus necessitating the fabrication of a P2 pole tip 76 having an even larger aspect ratio. As is next described, the present invention includes the fabrication of an improved P2 pole tip having a lengthened neck and a different method for engaging the yoke with the improved P2 pole tip.

Figure 6:
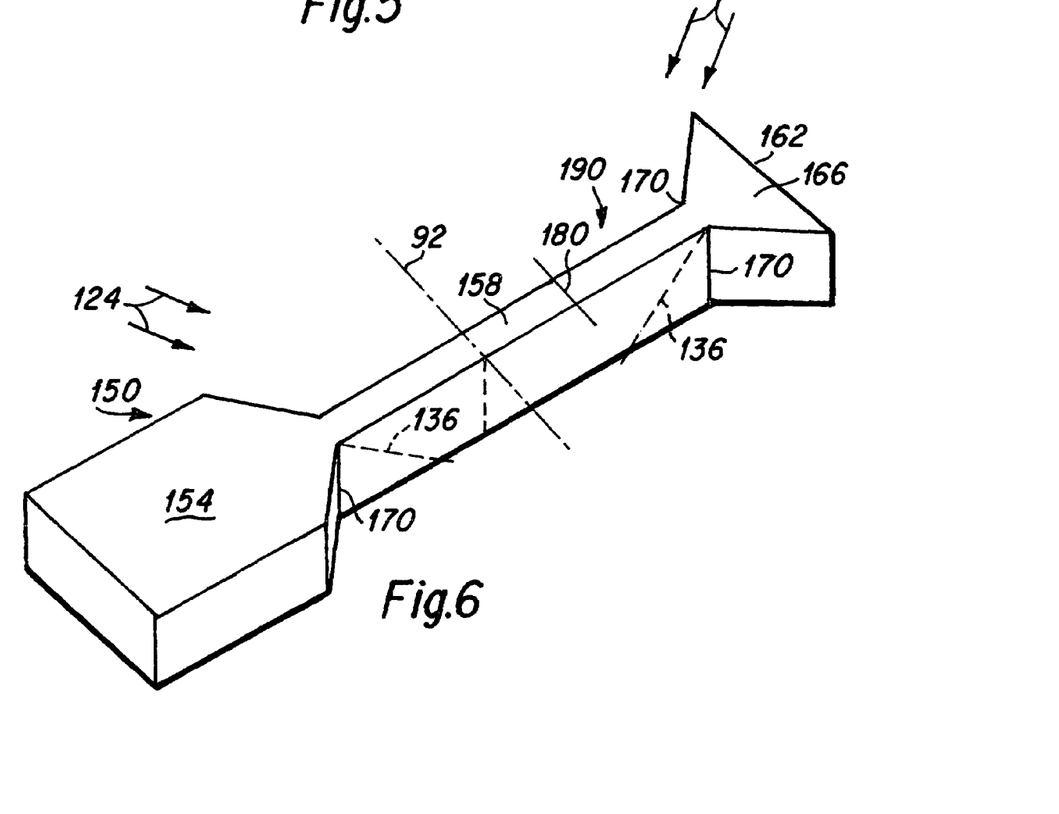
FIG. 6 is a perspective view depicting an improved pole tip of the present invention.

FIG. 6 is a perspective view depicting an embodiment of the improved P2 pole tip 150 of the present invention. As depicted therein, the P2 pole tip 150 includes an anchor piece 154, an elongated neck 158 and a triangular yoke interconnect piece 162 having a top surface 166. The intended location of the ABS 92 is in the approximate midpoint of the neck 158, which is well away from the flare points 170 of the pole tip 150, and desirably a distance greater than approximately seven P2B widths away from the yoke interconnect flare points 170. Now, with reference to the graph of FIG. 5, it can be understood that during the subsequent ion milling notching process, the P2B width will be quite consistent throughout an extended central portion of the neck 158, because the shadowing located proximate the flare points 170 is further away from the central portion of the neck where the ABS 92 will subsequently be created. As a result, the small processing variations in the location of the ABS during its fabrication process will not have an effect on the P2B width, such that magnetic heads from the same wafer will have a more consistent P2B dimension. As an additional benefit of the improved P2 pole tip 150, the time duration of the ion milling notching step is not as long as with the prior art pole tip because the shadowing effects are not as significant. Therefore, the initially fabricated P2 pole tip 150 does not have to have as great an aspect ratio because not as much material 132 is removed from it due to the shortened time duration required for the ion milling of the P1 pole notching step.

As will be understood by those skilled in the art, a P2 pole tip having an elongated neck portion from the ABS 92 to the location of the yoke can result in problematic magnetic saturation within the neck of the pole tip, resulting in unwanted wide writing due to stray magnetic fields. It is therefore desirable that the yoke of the second magnetic pole be fabricated close to the ABS. The present invention as is next described provides a solution to this problem.

Figure 7:
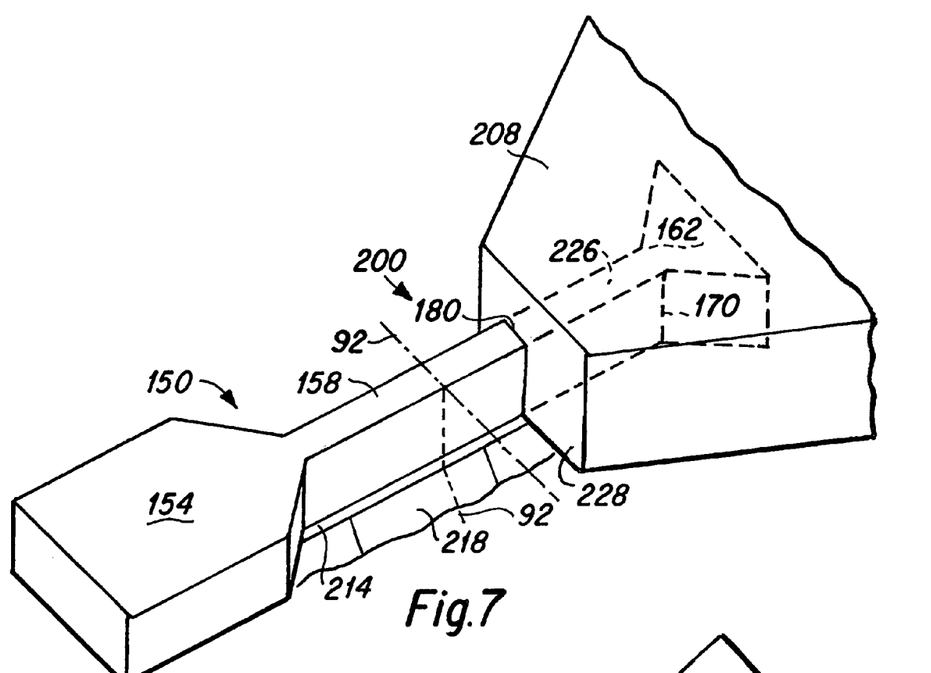
FIG. 7 is a perspective view of a magnetic pole of the present invention during a fabrication of a magnetic head of the present invention.
Figure 8:
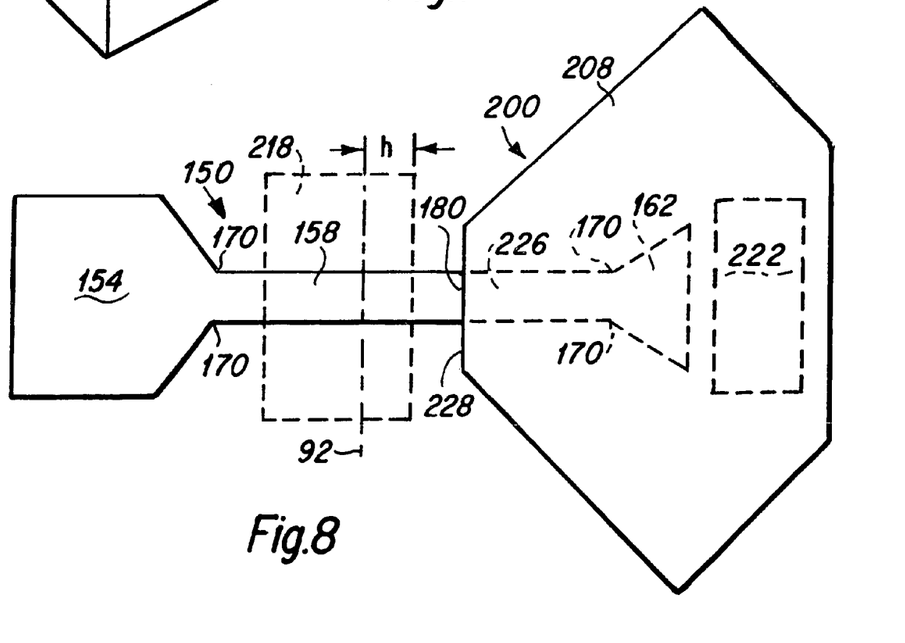
FIG. 8 is a top plan view of the magnetic pole depicted in FIG. 7.
Figure 9:
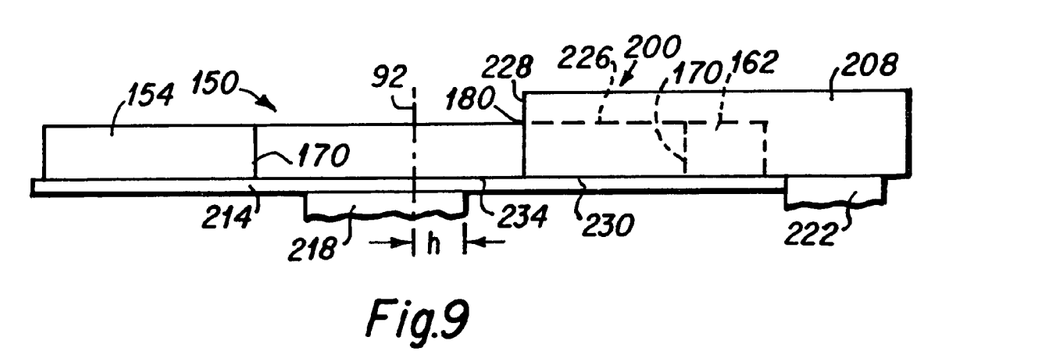
FIG. 9 is a side elevational view of the magnetic pole depicted in FIG. 7.

An improved second magnetic pole 200 for a magnetic head of the present invention is depicted in FIGS. 7, 8 and 9, wherein FIG. 7 is a perspective view of the P2 pole tip 150 and yoke 208 of the second magnetic pole 200, FIG. 8 is a top plan view thereof and FIG. 9 is a side elevational view thereof. As depicted in FIGS. 7, 8 and 9, the P2 pole tip 150 includes the anchor 154, the elongated neck 158 and the yoke interconnect piece 162. The ABS 92 is shown along with the write gap layer 214 and portions of the P1 pole pedestal 218 and back gap 222. In this magnetic pole embodiment 200, the yoke 208 is fabricated to surround and encapsulate the interconnect piece 162 as well as the portion 226 of the neck 158. The front portion 228 of the yoke 208 is formed at a point 229 between the flare point 170 and the ABS 92, and a suitable distance is approximately 3 to 5 times the P2B width from the ABS to the front portion 228 of the yoke 208. The encapsulation of the interconnect piece 162 within the yoke 208 is undertaken to improve the magnetic domain formation and magnetic flux flow in the neck 158 between the yoke 208 and the ABS 92. As can be best seen in the side elevational view of FIG. 9, the lower surface 230 of the yoke is essentially coplanar with the lower surface 234 of the P2 pole tip 150. The second magnetic pole 200 therefore lacks a clear throat height defining feature for a magnetic head that incorporates this second magnetic pole 200. Therefore, the throat height is mostly controlled by the throat height h of the P1 pole pedestal 218 that is fabricated beneath the P2 pole tip 150. It is to be noted that the front edge 228 of yoke structure 208 is further recessed away from the ABS 92 relative to the back edge 212 of the pedestal 218. Additionally, it is possible, although not necessary, that the interconnect piece 162 may overlap the back gap 222 of the head.

Figure 10:
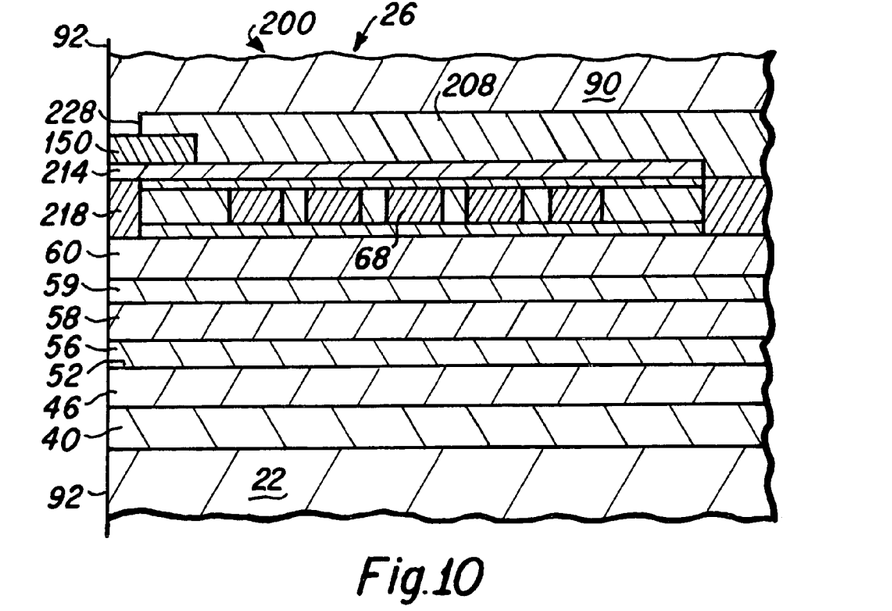
FIG. 10 is a side cross-sectional view depicting various components of the magnetic head of the present invention.

FIG. 10 is a side cross-sectional view that depicts a fabricated magnetic head 26 of the present invention. As with the prior art magnetic head depicted in FIG. 2. The magnetic head 26 may include identical read head components including a first magnetic shield layer 40, a read head sensor element 52 and a second magnetic shield layer 58. It is therefore to be understood that the magnetic head of the present invention makes no significant changes in the fabrication of the read head portion of the magnetic head. Also, as is well known to those skilled in the art, in an alternative magnetic head design the S2 shield 58 also serves as a first magnetic pole 60, in which case the insulation layer 59 is not fabricated. This alternative magnetic head design is termed a merged magnetic head, and the present invention can be fabricated above the shield/pole 58 of a merged magnetic head in the same manner as it is fabricated in the piggyback magnetic head design that is described in detail herein.

As depicted in FIG. 10, following the fabrication of the P1 pole layer 60, the P1 pole pedestal 218 is fabricated with attention being given to the desired throat height h of the P1 pole pedestal 218 as it will control the throat height of the magnetic head 26. Thereafter, induction coils 68 are fabricated within the layer that includes the P1 pole pedestal 218 and the write gap layer 214 is subsequently deposited thereabove. These fabrication steps are well known in the prior art and depicted and described hereabove with regard to the prior art magnetic head depicted in FIG. 2.

Following the fabrication of the write gap layer 214, the P2 pole tip 150 of the present invention is fabricated and the P1 pole pedestal ion milling notching step is performed. Thereafter, the yoke portion 208 of the second magnetic pole layer 200 is fabricated utilizing well known photolithographic techniques which may include the deposition of a photoresist and the formation of a yoke cavity therewithin, where the interconnect piece 162 is disposed within the cavity. This is followed by the deposition of a seed layer and the electroplating of the yoke within the yoke cavity. The electroplating of the yoke within the cavity results in the encapsulation of the yoke interconnect piece within the yoke. Further magnetic head components, as are well known to those skilled in the art, are subsequently fabricated and the magnetic head is subsequently encapsulated, typically with an alumina encapsulation layer 90. Thereafter, rows of magnetic heads are sliced from the wafer and the magnetic head ABS 92 is subsequently formed in process steps that are well known to those skilled in the art.

It is generally desirable that the yoke material be a relatively high magnetic saturation material such as nickel iron 45/55 and that the pole tip have a high magnetic moment that would be obtained by utilizing a cobalt iron alloy.

It is therefore to be understood that significant features of the magnetic pole 200 of the present invention include a more uniformly formed P2 pole tip in that the initial aspect ratio of the pole tip is less than required in the prior art, and that the improved ion milling notching step, due to reduced shadowing of the pole tip 150, results in a more uniform P2B width for magnetic heads fabricated upon the surface of a substrate, thereby obtaining improved yield in the fabrication of the magnetic heads.

In the magnetic pole 200 of the present invention the magnetic flux transfer between the yoke and the pole tip is an important factor. Because the pole tip and the yoke materials are dissimilar, a magnetic discontinuity occurs at the interface between the two structures. It is also desirable to have the magnetic domains in the yoke and the pole tip be substantially parallel to the ABS plane 92. Therefore, it is ideal that the surface of the pole tip structure 150 be non-perpendicular to the ABS plane. This will promote domains that are not perpendicular to the ABS plane 92 when the write head is in its quiescent state.

Figure 11:
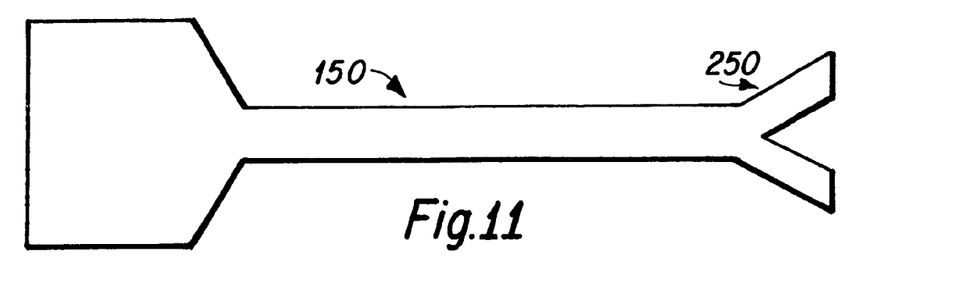
FIGS. 11–14 are top plan views depicting alternative pole tips of the present invention.
Figure 12:
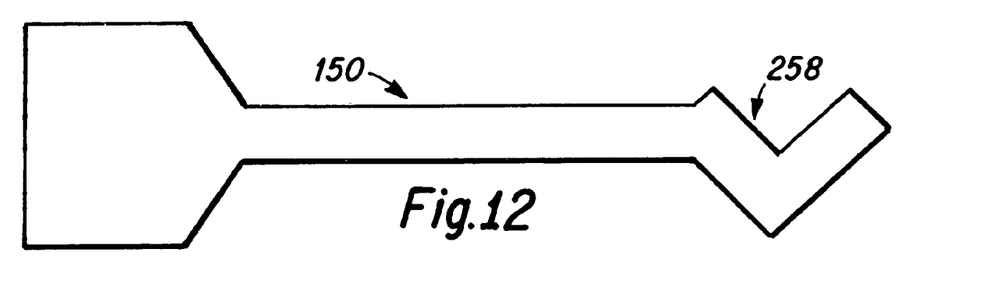
Figure 13:
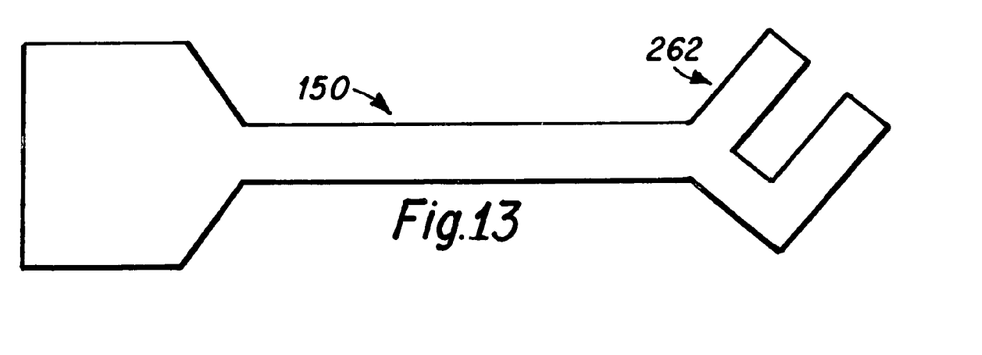
Figure 14:
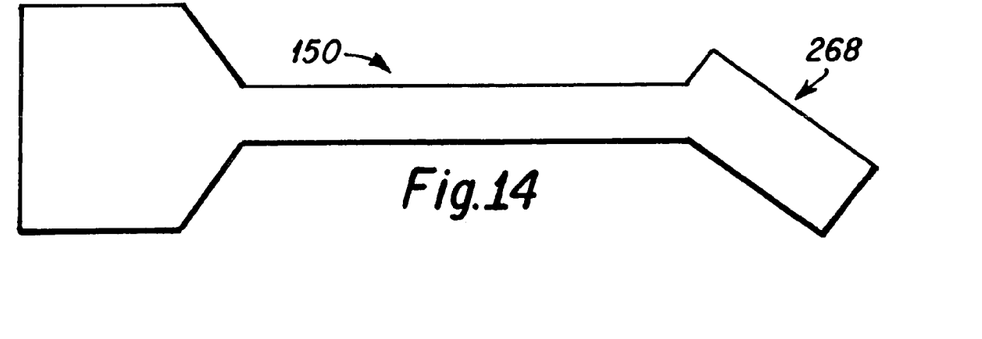

To accomplish the desired magnetic flux flow and domain formation, the shape of the yoke interconnect piece of the pole tip 150 can be altered, and FIGS. 11–14 depict four such alternative altered yoke interconnect shapes for the magnetic pole 150. As depicted in FIG. 11, the magnetic pole 150 can have a yoke interconnect piece 270 that is generally V-shaped. Alternatively, as depicted in FIG. 12, the yoke pole tip 150 can have a yoke interconnect 278 that is generally L-shaped. Alternatively, as depicted in FIG. 13, the pole tip 150 can be formed with a yoke interconnect 282 that is generally U-shaped. Alternatively, as depicted in FIG. 14, the pole tip 150 can be formed with a yoke interconnect piece 288 that is generally I-shaped. As will be understood by those skilled in the art, the various yoke interconnect shapes depicted and described herein, triangular 162, "V" 250, "L" 258, "U" 262 and "I" 268 are exemplary, and other yoke interconnect shapes are within the scope of the present invention. Generally, having a relatively small interconnect piece 162 is desirable where the volume of the pole is small relative to the volume of the yoke 208, as shown in FIG. 7. However, if the yoke length of the head is long or the pole shape can be altered, there are other interconnect piece shapes that can be utilized.

It was stated earlier that for optimizing performance, it is desirable to limit the length (throat height) of the unencapsulated narrow neck region 158 of the pole tip. The encapsulating yoke 208 portion of the pole 200 increases in width (flares) with sufficient rapidity to avoid side-writing. This geometrical flaring will both avoid saturation and minimize remanence of the magnetic material of the yoke in the region immediately above the flare 170. The latter will likely be of at least some utility in controlling the remanence and the reversal speed of the unencapsulated pole tip material which ultimately produces the desired large, high-gradient recording fields at the media.

The preceding description assumes generally perfect magnetic continuity between the material forming the pole tip 150, and that of the yoke 208 which encapsulates it. However, it is almost certainly the case that the pole tip material will be an alloy, such as CoFe, chosen specifically for having an absolute maximum saturation magnetization Bs of approximately 24 kG. Such materials also have a tendency for high magnetostriction and high coercivity, and are likely not the optimal choice for building the yoke structure. It is also likely that the optimal yoke material, such as NiFe, will have substantially lower Bs of approximately 16 kG than that of the pole tip. This substantial mismatch in saturation flux density can lead to an effective magnetic discontinuity at the interface between the pole tip and the encapsulating yoke material, particularly when the direction of magnetization would otherwise prefer to be normal to the plane of the interface between pole tip and encapsulating yoke material. This may result in higher remanence and poorer switching properties of the pole tip, despite geometrically achieving the short throat height and flared yoke geometry describer earlier.

Because the pole tip and yoke are formed of dissimilar materials, it is particularly desirable to minimize this potential magnetic discontinuity in the normal component of the magnetization, in the case where the yoke magnetization direction is parallel to the ABS plane 92, which represents either the quiescent state, or that state midway between a reversal during write operation. It is also desirable to do this while keeping the encapsulated portion of the pole tip a small fraction of the total volume of the yoke, thereby minimizing the detrimental effects of the aforementioned undesirable magnetic properties of this high Bs material. As taught in the present invention, this can be achieved by judicious choice of the geometry of the encapsulated portion of the pole tip 150.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention. Further, Applicant's intent is to encompass the equivalents of all claim elements, and any amendment to any claim in the present application should not be construed as a disclaimer of any interest in or right to an equivalent of any element or feature of the amended claim.

What is claimed is:

1. A magnetic head, comprising:
  a first magnetic pole;
  a second magnetic pole;
  a gap layer being disposed between said first magnetic pole and said second magnetic pole;
  said second magnetic pole including a pole tip and a yoke;
  said pole tip including a base that is disposed at an air bearing surface (ABS) of the magnetic head, and a flare point that is disposed away from said pole tip base and within said magnetic head; said pole tip also including a lower surface that is disposed upon said gap layer;

said yoke having a lower surface, and a front portion; and said yoke and said pole tip being substantially coplanar.

2. A magnetic head as described in claim 1 wherein said flare point of said pole tip is disposed within said yoke.

3. A magnetic head as described in claim 1 wherein said pole tip is formed with a yoke interconnect piece, and wherein said yoke interconnect piece is encapsulated within said yoke.

4. A magnetic head as described in claim 1 wherein said lower surface of said pole tip and said lower surface of said yoke are coplanar.

5. A magnetic head as described in claim 2 wherein said lower surface of said pole tip and said lower surface of said yoke are coplanar.

6. A magnetic head as described in claim 1 where a material that forms said pole tip and a material that forms said yoke are dissimilar.

7. A magnetic head as described in claim 1 wherein a distance between said ABS surface of said pole tip to said flare point is greater than the distance between said ABS surface of said pole tip to said front portion of said yoke.

8. A magnetic head as described in claim 7 wherein a distance between said ABS surface of said pole tip and said flare point is approximately at least 7 times the width of said pole tip base, and a distance between said ABS surface of said pole tip and said front portion of said yoke is approximately 3 to 5 times the width of said pole tip base.

9. A magnetic head as described in claim 3 wherein said yoke interconnect piece, when viewed in a top plan view, is shaped as one of a triangle, an L-shape, a V-shape, a U-shape or an I-shape.

10. A magnetic head as described in claim 3 where said yoke interconnect piece is physically connected to a back gap piece of the magnetic head.

11. A hard disk drive including a magnetic head, comprising:
    a first magnetic pole;
    a second magnetic pole;
    a gap layer being disposed between said first magnetic pole and said second magnetic pole;
    said second magnetic pole including a pole tip and a yoke;
    said pole tip including a base that is disposed at an air bearing surface (ABS) of the magnetic head, and a flare point that is disposed away from said pole tip base and within said magnetic head; said pole tip also including a lower surface that is disposed upon said gap layer;
    said yoke having a lower surface, and a front portion; and
    said yoke being and said pole tip being substantially coplanar.

12. A hard disk drive including a magnetic head as described in claim 11 wherein said flare point of said pole tip is disposed within said yoke.

13. A hard disk drive including a magnetic head as described in claim 11 wherein said pole tip is formed with a yoke interconnect piece, and wherein said yoke interconnect piece is encapsulated within said yoke.

14. A hard disk drive including a magnetic head as described in claim 11 wherein said lower surface of said pole tip and said lower surface of said yoke are coplanar.

15. A hard disk drive including a magnetic head as described in claim 12 wherein said lower surface of said pole tip and said lower surface of said yoke are coplanar.

16. A hard disk drive including a magnetic head as described in claim 11 where a material that forms said pole tip and a material that forms said yoke are dissimilar.

17. A hard disk drive including a magnetic head as described in claim 11 wherein a distance between said ABS surface of said pole tip to said flare point is greater than the distance between said ABS surface of said pole tip to said front portion of said yoke.

18. A hard disk drive including a magnetic head as described in claim 17 wherein a distance between said ABS surface of said pole tip and said flare point is approximately at least 7 times the width of said pole tip base, and a distance between said ABS surface of said pole tip and said front portion of said yoke is approximately 3 to 5 times the width of said pole tip base.

19. A hard disk drive including a magnetic head as described in claim 13 wherein said yoke interconnect piece, when viewed in a top plan view, is shaped as one of a triangle, an L-shape, a V-shape, a U-shape or an I-shape.

20. A hard disk drive including a magnetic head as described in claim 3 where said yoke interconnect piece is connected to a back gap piece of the magnetic head.

* * * * *